United States Patent
Duncan

(10) Patent No.: US 11,533,984 B2
(45) Date of Patent: Dec. 27, 2022

(54) HOLSTER

(71) Applicant: H6 Tactical, Inc., St. Petersburg, FL (US)

(72) Inventor: Sean C Duncan, Tampa, FL (US)

(*) Notice: Subject to any disclaimer, the term of this patent is extended or adjusted under 35 U.S.C. 154(b) by 0 days.

(21) Appl. No.: 16/371,410

(22) Filed: Apr. 1, 2019

(65) Prior Publication Data
US 2019/0298046 A1 Oct. 3, 2019

Related U.S. Application Data

(60) Provisional application No. 62/650,428, filed on Mar. 30, 2018.

(51) Int. Cl.
| | | |
|---|---|---|
| *A45F 5/02* | (2006.01) | |
| *A45F 3/14* | (2006.01) | |
| *F16M 13/04* | (2006.01) | |
| *A45C 13/30* | (2006.01) | |

(52) U.S. Cl.
CPC .............. *A45F 5/021* (2013.01); *A45C 13/30* (2013.01); *A45F 3/14* (2013.01); *A45F 2003/144* (2013.01); *A45F 2200/0516* (2013.01); *F16M 13/04* (2013.01)

(58) Field of Classification Search
CPC .... A45F 5/02; A45F 2200/0516; A45F 5/021; A45F 2200/0575; A45C 2011/002; A45C 2011/001; A45C 13/1046; A45C 2013/1061; A45C 7/0063; Y10S 224/93; Y10S 224/904
USPC ........ 224/236, 655, 931, 223, 904; 190/902, 190/103
See application file for complete search history.

(56) References Cited

U.S. PATENT DOCUMENTS

| 1,648,565 | A | * | 11/1927 | Primley ................. A63B 47/00 206/315.9 |
| 3,294,135 | A | * | 12/1966 | Brenner ............. A45C 13/1053 190/119 |
| D251,217 | S | * | 3/1979 | Mucha .......................... D3/225 |
| 5,121,865 | A | * | 6/1992 | Howard ..................... A45F 5/00 224/240 |
| 5,562,238 | A | * | 10/1996 | White ..................... F41C 33/00 224/237 |
| D437,111 | S | * | 2/2001 | Bergh ........................... D3/218 |
| 6,209,769 | B1 | | 4/2001 | Seals |

(Continued)

FOREIGN PATENT DOCUMENTS

KR 20110021393 A 3/2011

*Primary Examiner* — Adam J Waggenspack

(57) ABSTRACT

A holster includes a backing, a pouch, a strap assembly, and a liner. The pouch includes a first securing element disposed along a front wall thereof. The pouch is coupled to the backing to cooperatively define a cavity configured to receive a communications device. The strap assembly is coupled to the backing and selectively couplable with the pouch. The strap assembly includes a cord, a handle, and a second securing element. The handle is coupled to the cord along a portion of the cord opposite the backing. The second securing element is disposed along a rear surfaces of the handle. The second securing element is couplable to the first securing element. The liner includes a fire resistant material and/or a fire retardant material and is disposed within the cavity along at least one of an interior surface of the backing and an interior surface of the pouch.

1 Claim, 11 Drawing Sheets

(56) References Cited

U.S. PATENT DOCUMENTS

| | | | |
|---|---|---|---|
| 6,330,430 B1 | 12/2001 | Jensfelt | |
| 6,364,187 B1 * | 4/2002 | Castellano | A45F 5/02 |
| | | | 224/236 |
| 6,412,674 B1 * | 7/2002 | Lipke | A45C 7/00 |
| | | | 224/235 |
| 6,561,402 B2 * | 5/2003 | Holland | A45F 5/00 |
| | | | 224/192 |
| 7,270,255 B2 * | 9/2007 | Badillo | A45C 9/00 |
| | | | 224/191 |
| 7,845,527 B1 * | 12/2010 | McMillan | B26B 29/02 |
| | | | 224/232 |
| 9,144,294 B2 * | 9/2015 | Gregory | A41D 13/0012 |
| 9,427,069 B1 * | 8/2016 | Carver | A45F 5/00 |
| 2002/0130150 A1 | 9/2002 | Stanley | |
| 2005/0011904 A1 * | 1/2005 | Godshaw | A45C 11/24 |
| | | | 220/796 |
| 2005/0221762 A1 * | 10/2005 | Greene | A45F 5/021 |
| | | | 455/66.1 |
| 2009/0190865 A1 * | 7/2009 | Chang | A45C 3/001 |
| | | | 383/110 |
| 2012/0111909 A1 | 5/2012 | Pappas | |
| 2012/0181318 A1 | 7/2012 | Mongan | |
| 2016/0081446 A1 | 3/2016 | Maddox et al. | |
| 2018/0020791 A1 * | 1/2018 | Cole | A45C 3/00 |
| | | | 224/576 |
| 2018/0235351 A1 * | 8/2018 | Caldwell | H04B 1/385 |

* cited by examiner

HOLSTER

CROSS-REFERENCE TO RELATED PATENT APPLICATIONS

This application claims the benefit of U.S. Provisional Application No. 62/650,428, filed Mar. 30, 2018, which is incorporated herein by reference in its entirety.

BACKGROUND

The present disclosure relates to holsters, and more specifically to holsters that receive and secure a radio communications device therein.

SUMMARY

One embodiment relates to a holster for a communications device. The holster includes a backing, a pouch, a first coupler, a second coupler, a strap assembly, and a liner. The backing has a first longitudinal edge, an opposing second longitudinal edge, a first lateral edge, and an opposing second lateral edge. The pouch has a front wall, a first sidewall, an opposing second sidewall, and a bottom wall. The pouch includes a first securing element disposed along the front wall. The first sidewall is coupled along the first longitudinal edge of the backing. The opposing second sidewall is coupled along the opposing second longitudinal edge of the backing. The bottom wall is coupled along the opposing second lateral edge of the backing. The backing and the pouch cooperatively define a cavity configured to selectively receive the communications device. The first coupler is secured to the backing along the first lateral edge proximate the first longitudinal edge. The first coupler defines a first eyelet that extends through a first component of the first coupler and the backing. The second coupler is secured to the backing along the first lateral edge proximate the opposing second longitudinal edge. The second coupler defines a second eyelet that extends through a second component of the second coupler and the backing. The strap assembly is coupled to the backing and selectively couplable with the pouch. The strap assembly includes a cord, a handle, and a second securing element.

The cord extends through the first eyelet and the second eyelet. The handle is coupled to the cord along a portion of the cord opposite the backing. The second securing element is disposed along a rear surface of the handle. The second securing element is selectively couplable to the first securing element of the pouch. The liner is disposed within the cavity along at least one of an interior surface of the backing and an interior surface of the pouch. The liner includes at least one of a fire resistant material and a fire retardant material.

Another embodiment relates to a holster for a communications device. The holster includes a backing, a pouch, a strap assembly, and a liner. The backing has a first longitudinal edge, an opposing second longitudinal edge, a first lateral edge, and an opposing second lateral edge. The backing includes a first loop coupled along the first lateral edge proximate the first longitudinal edge and a second loop coupled along the first lateral edge proximate the opposing second longitudinal edge. The pouch has a front wall, a first sidewall, an opposing second sidewall, and a bottom wall. The pouch includes a first securing element disposed along the front wall. The first sidewall is coupled along the first longitudinal edge of the backing. The opposing second sidewall is coupled along the opposing second longitudinal edge of the backing. The bottom wall is coupled along the opposing second lateral edge of the backing. The backing and the pouch cooperatively define a cavity configured to selectively receive the communications device. The strap assembly is coupled to the backing and selectively couplable with the pouch. The strap assembly includes a cord, a handle, and a second securing element.

The cord extends through the first loop and the second loop. The handle is coupled to the cord along a portion of the cord opposite the backing. The second securing element is disposed along a rear surface of the handle. The second securing element is selectively couplable to the first securing element of the pouch. The liner is disposed within the cavity along at least one of an interior surface of the backing and an interior surface of the pouch. The liner includes at least one of a fire resistant material and a fire retardant material.

Still another embodiment relates to a holster for a communications device. The holster includes a backing, a pouch, a strap assembly, and a liner. The pouch is coupled to the backing. The backing and the pouch cooperatively define a cavity configured to selectively receive the communications device. The strap assembly is coupled to the backing and selectively couplable with the pouch. The liner is disposed within the cavity. The liner includes at least one of a fire resistant material and a fire retardant material.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
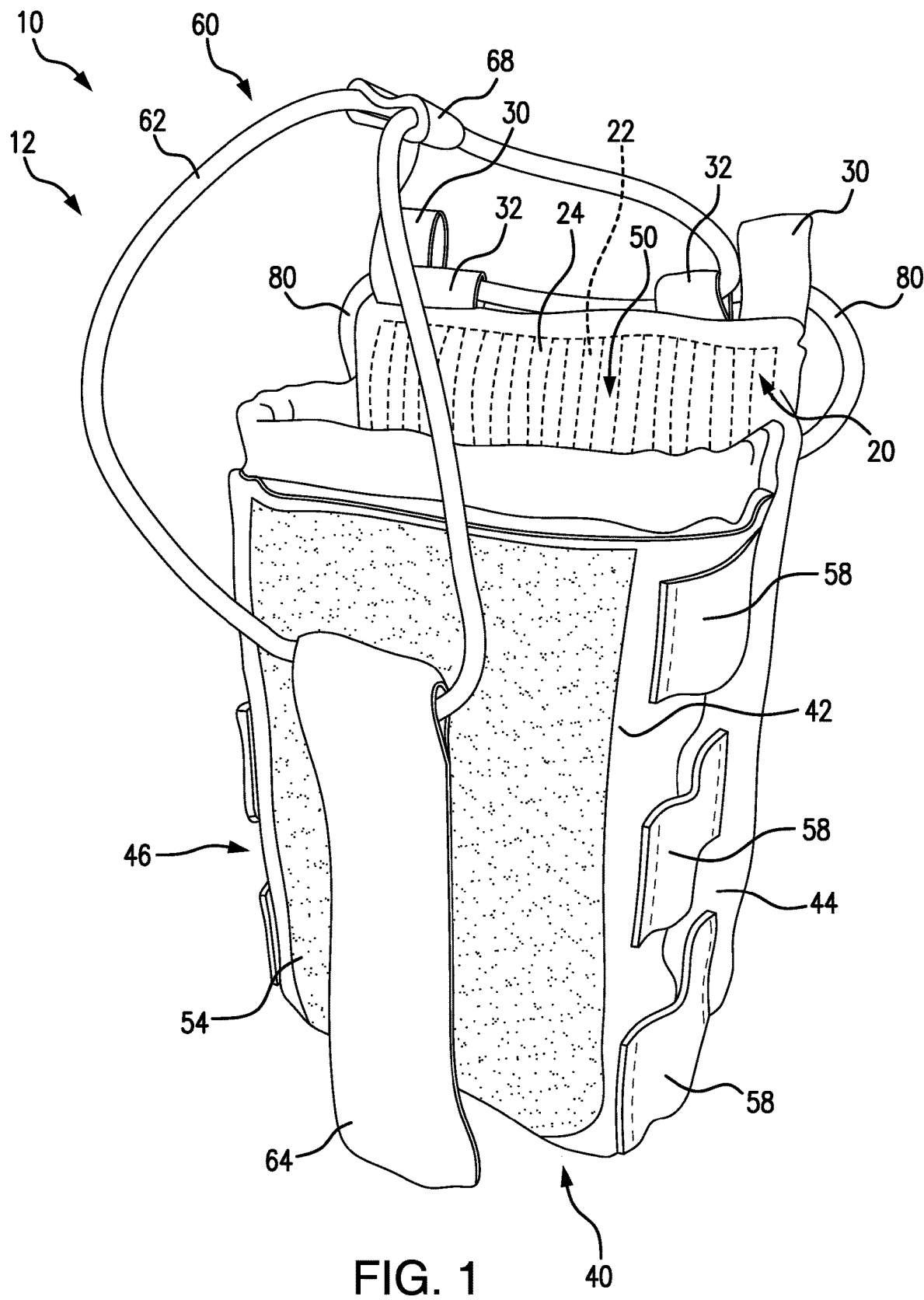
FIG. 1 is a front perspective view of a holster in a closed configuration, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to the exemplary embodiment shown in FIGS. 1-12, a first device holder, shown as holster 10, is configured to receive and secure a device therein. By way of example, the holster 10 may be configured to receive and secure a communications device therein. The communications device may include a radio device, a walkie-talkie, a cell phone, a smart phone, and/or any other portable user communications device. By way of another example, the holster 10 may be configured to receive and secure any device (e.g., a hand tool, a weapon, a knife, a gun, a water bottle, etc.) that fits therein.

As shown in FIGS. 1-12, the holster 10 includes a back portion, shown as backing 20; a front portion, shown as pouch 40, coupled to the backing 20; a closure assembly, shown as strap assembly 60, coupled to the backing 20 and selectively couplable with the pouch 40; and securing elements, shown as coupling rings 80, coupled to the backing 20. As shown in FIGS. 1-3 and 5, the backing 20 includes a rigid layer, shown as plate 22; an interior layer, shown as interior liner 24; and an exterior layer, shown as exterior liner 26. According to an exemplary embodiment, the plate 22 is disposed between (e.g., sandwiched between, etc.) the interior liner 24 and the exterior liner 26 (e.g., within a pocket formed therebetween, etc.). By way of example, the backing 20 may be manufactured by (i) placing the plate 22 between a layer of the interior liner 24 and a layer of the exterior liner 26 and (ii) sewing around the periphery of the plate 22 such that the plate 22 is secured within the pocket formed within the backing 20. In other embodiments, the plate 22 is positioned externally on the backing 20. In still other embodiments, the backing 20 does not include the plate 22. Further, while in some embodiments the plate 22 may be rigid, in other embodiments, the plate 22 may be semi-rigid or flexible, but still be stiffer than the interior liner 24 and the exterior liner 26 to provide support for the holster 10.

According to an exemplary embodiment, the plate 22 of the backing 20 provides rigidity to the backing 20 such that the holster 10 holds the shape thereof. The plate 22 may be manufactured from a metal material (e.g., aluminum, etc.), a plastic material, a composite material (e.g., carbon fiber, etc.), and/or still other suitable materials that can provide rigidity to the backing 20. According to an exemplary embodiment, the interior liner 24 of the backing 20 is manufactured from a fire resistant material and/or a fire retardant material. In one embodiment, the interior liner 24 is manufactured from a soft, pliant, and human skin-friendly fabric that is both flame resistant and provides heat blocking performance. By way of example, the interior liner 24 may be manufactured from Kovenex™ M-Style KOV-PR-0208 fabric. In other embodiments, the interior liner 24 is manufactured from still another suitable material. The exterior liner 26 of the backing 20 may be manufactured from a water resistant material, a water proof material, a cut resistant material, a tear resistant material, a wear resistant material, and/or a heavy duty material (e.g., Kevlar®, nylon, etc.).

As shown in FIGS. 1-5, the backing 20 includes a first pair of couplers, shown as first loops 30, attached (e.g., sewn, stitched, fixed, etc.) at opposing lateral sides of an upper lateral edge of the backing 20 and a second pair of couplers, shown as second loops 32, attached (e.g., sewn, stitched, fixed, etc.) at the opposing lateral side of the upper lateral edge of the backing 20 between the first loops 30. According to an exemplary embodiment, the first loops 30 and the second loops 32 are manufactured from a fabric material in a strip and sewn or stitched in a loop shape to the backing 20. As shown in FIGS. 1-5, the first loops 30 are configured to receive and couple (e.g., secure, attach, etc.) the coupling rings 80 to the backing 20. According to an exemplary embodiment, the coupling rings 80 facilitate coupling the holster 10 to a strap, belt, or other device that can be worn by a user of the holster 10. One such device is disclosed in commonly-owned U.S. patent application Ser. No. 16/032, 134, which is incorporated by reference herein in its entirety. In other embodiments, the coupling rings 80 are replaced with clips, clasps, ties, and/or still other types of suitable coupling elements.

Figure 2:
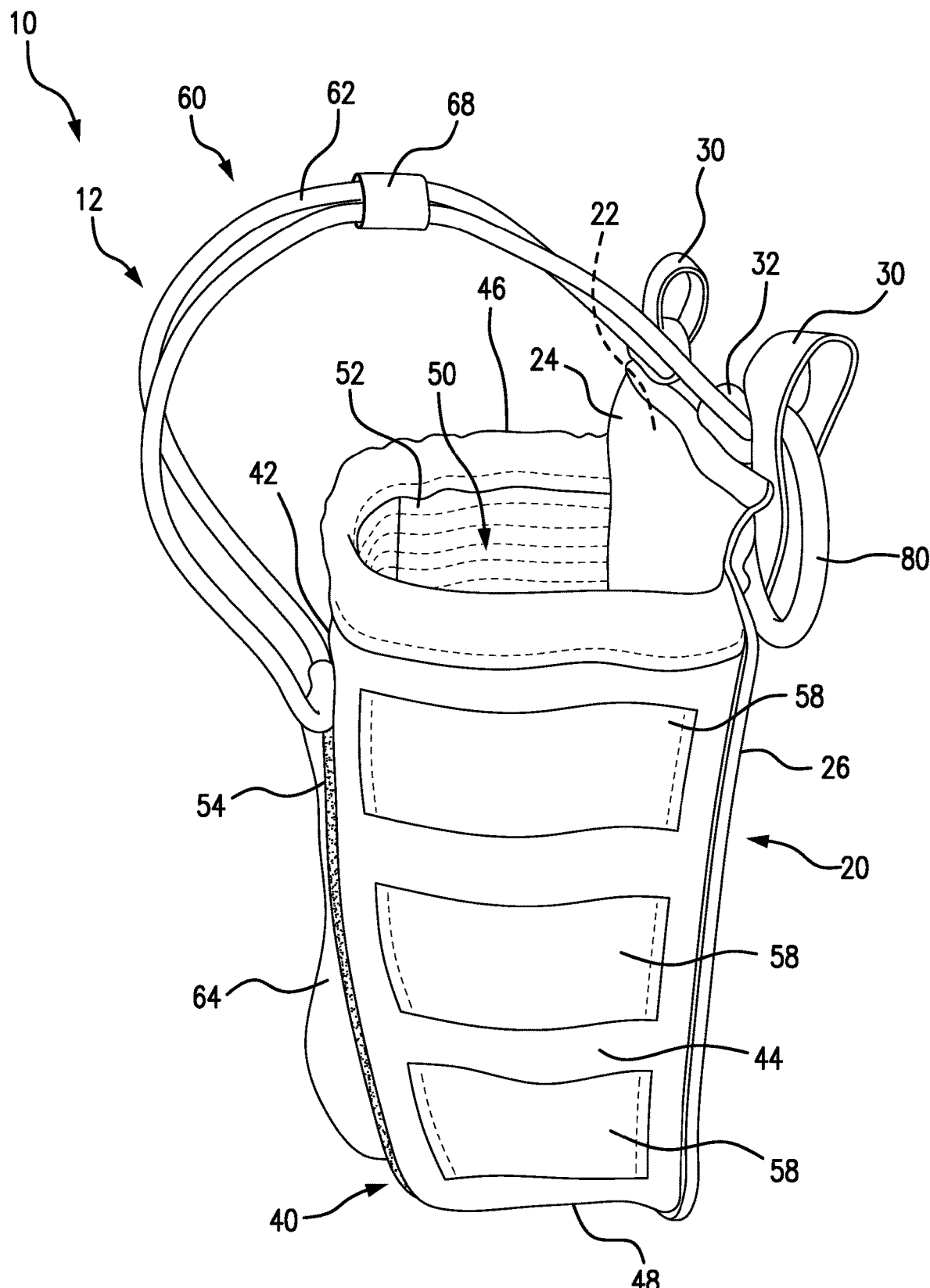
FIG. 2 is a side perspective view of the holster of FIG. 1, according to an exemplary embodiment.
Figure 3:
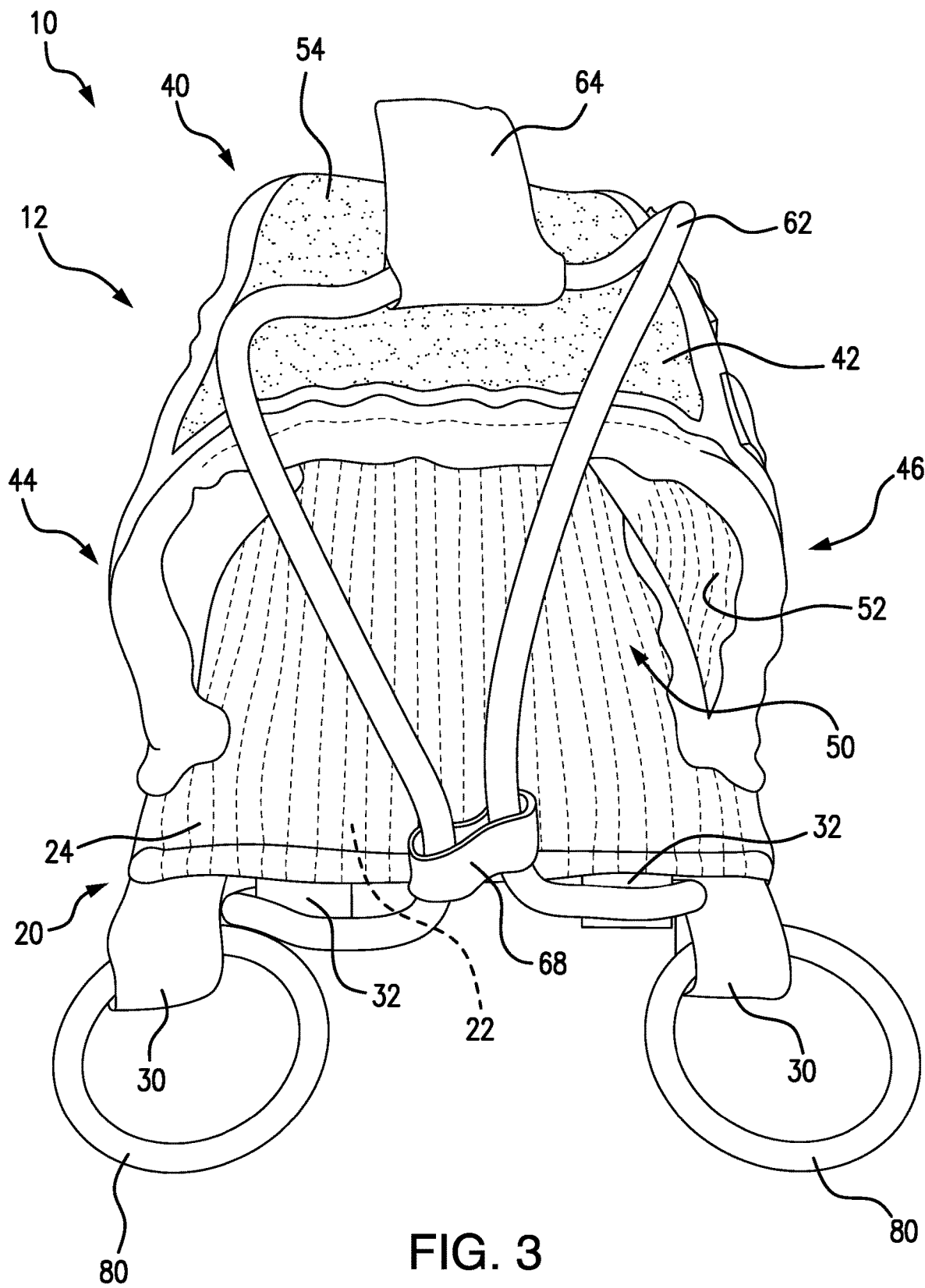
FIG. 3 is a top perspective view of the holster of FIG. 1, according to an exemplary embodiment.
Figure 4:
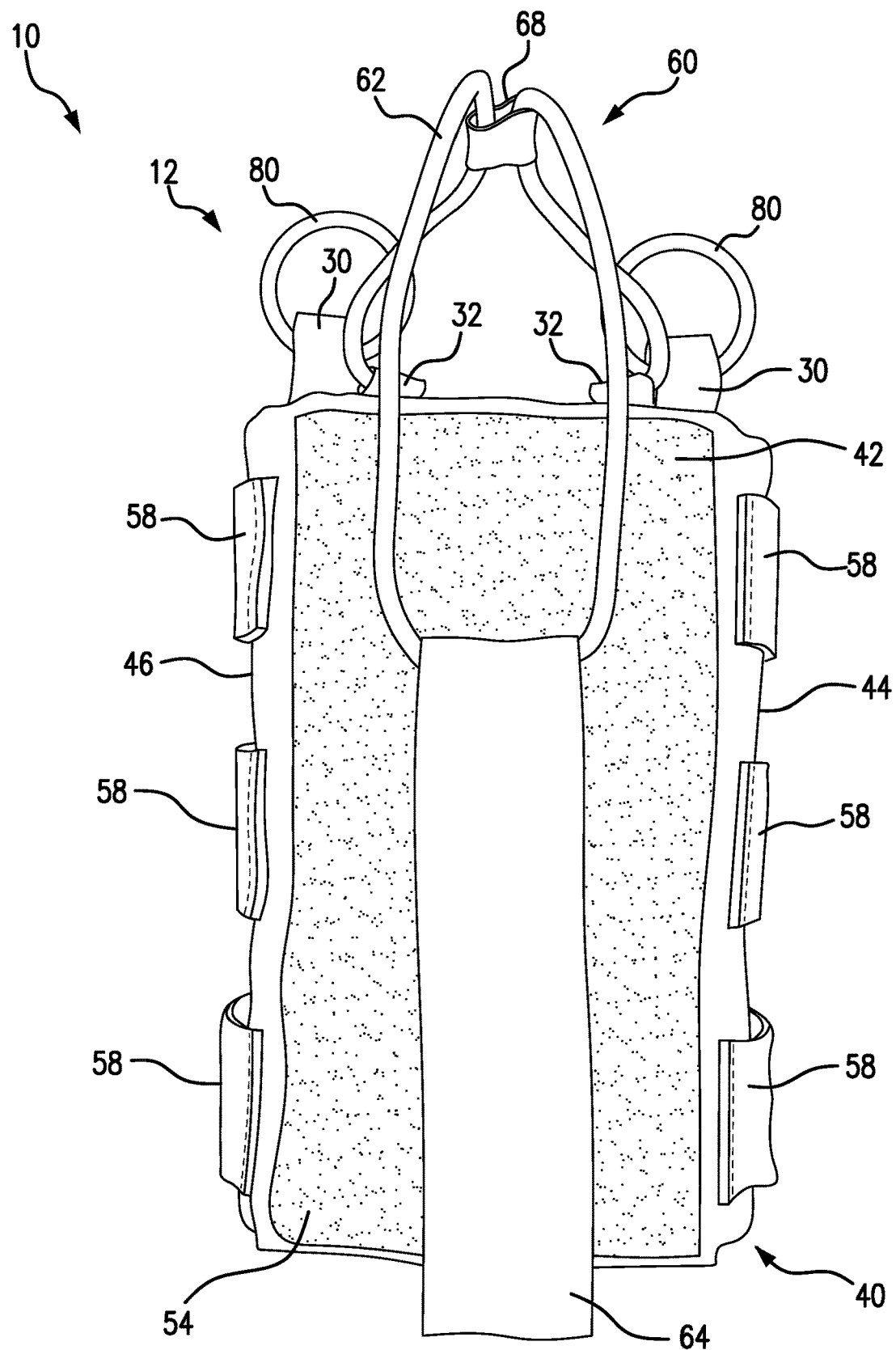
FIG. 4 is a front view of the holster of FIG. 1, according to an exemplary embodiment.
Figure 5:
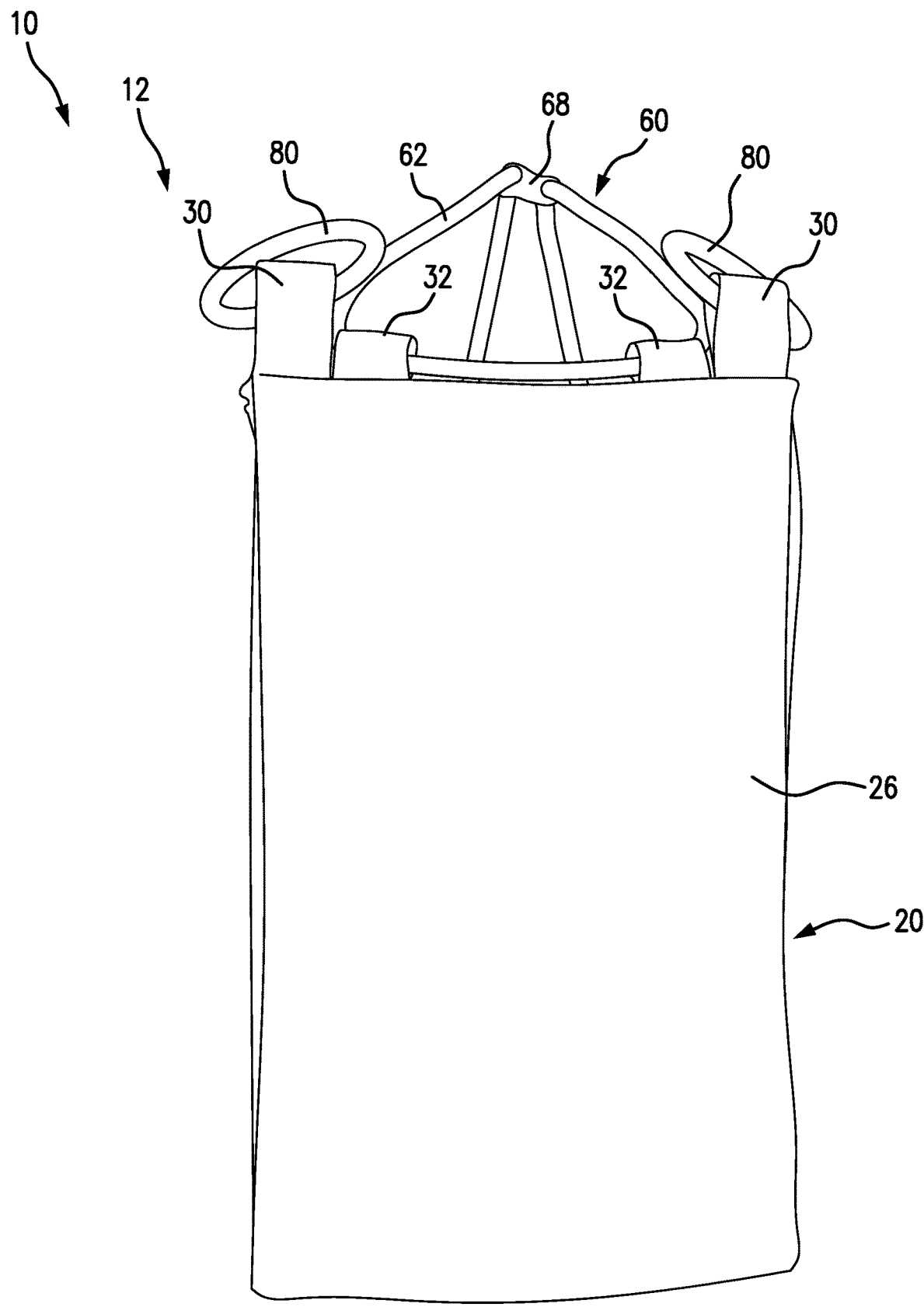
FIG. 5 is a rear view of the holster of FIG. 1, according to an exemplary embodiment.
Figure 6:
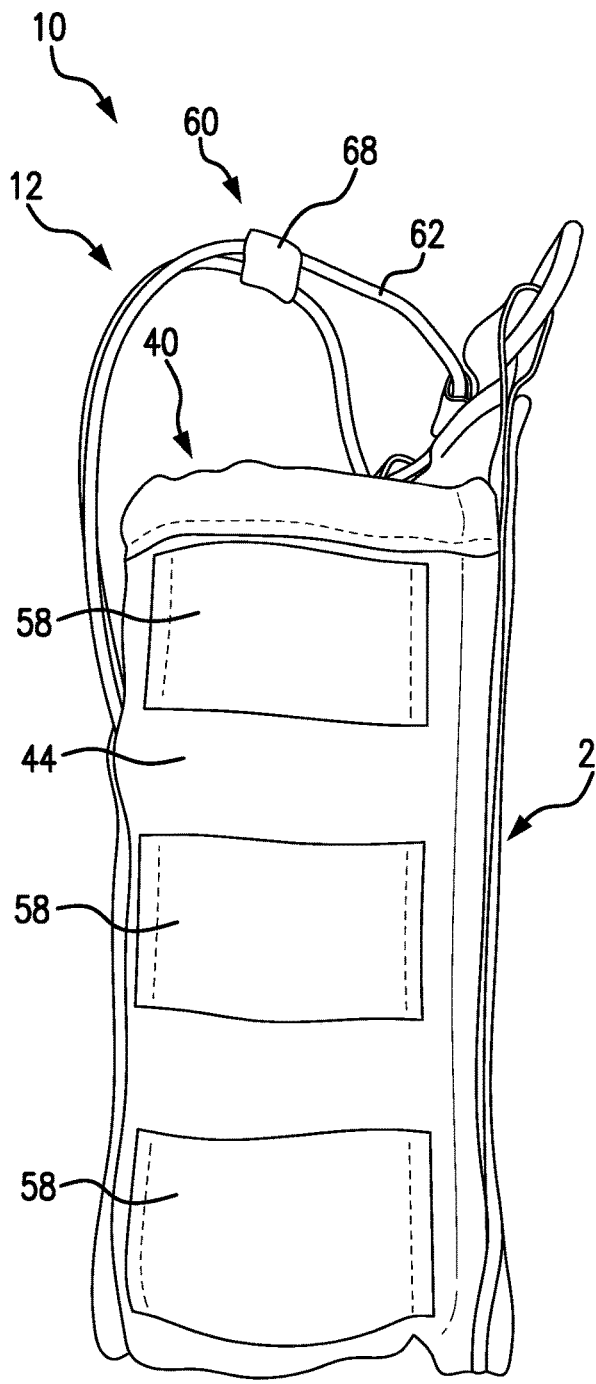
FIG. 6 is a left side view of the holster of FIG. 1, according to an exemplary embodiment.
Figure 7:
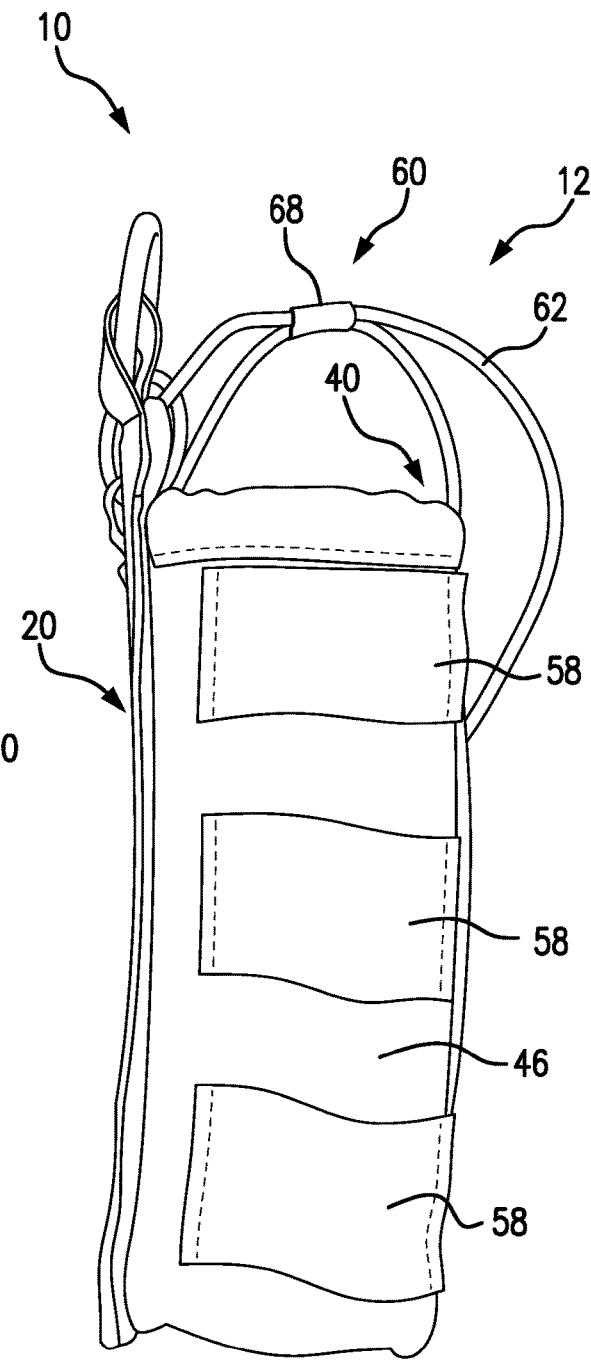
FIG. 7 is a right side view of the holster of FIG. 1, according to an exemplary embodiment.
Figure 8:
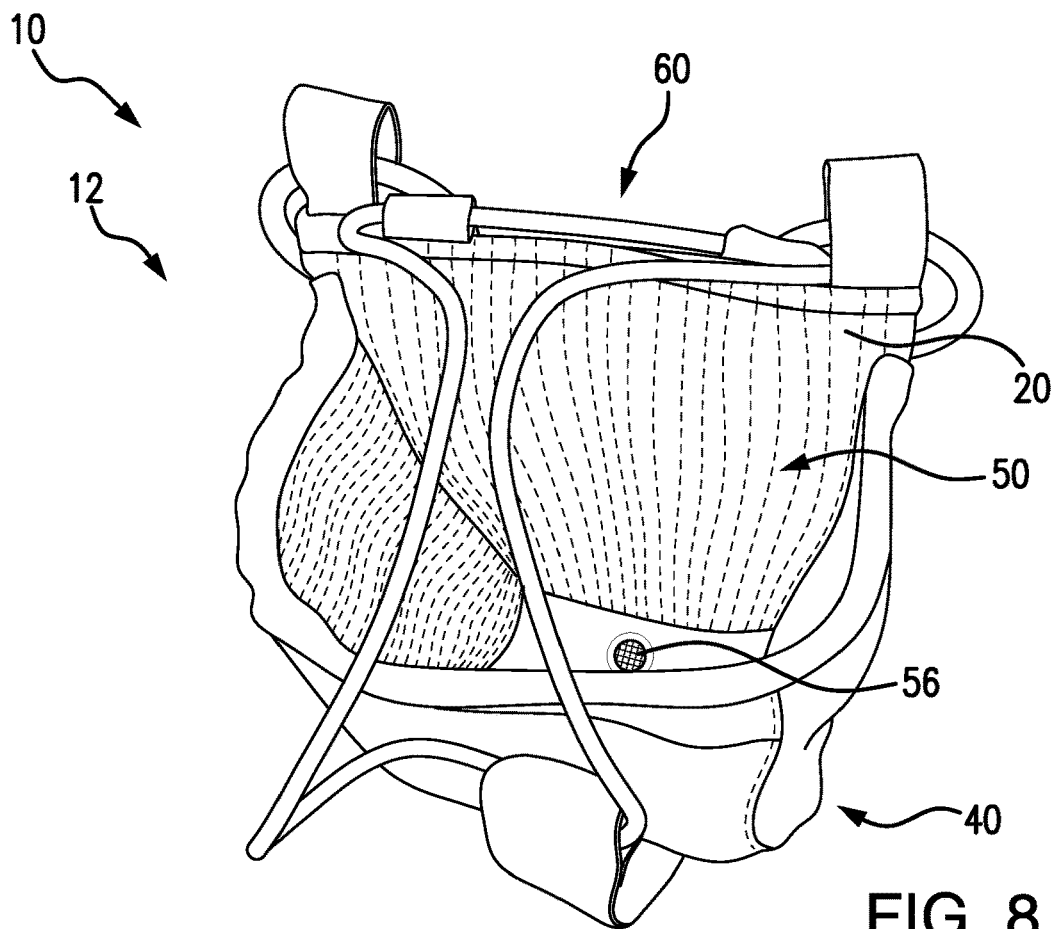
FIG. 8 is a top view of the holster of FIG. 1, according to an exemplary embodiment.
Figure 9:
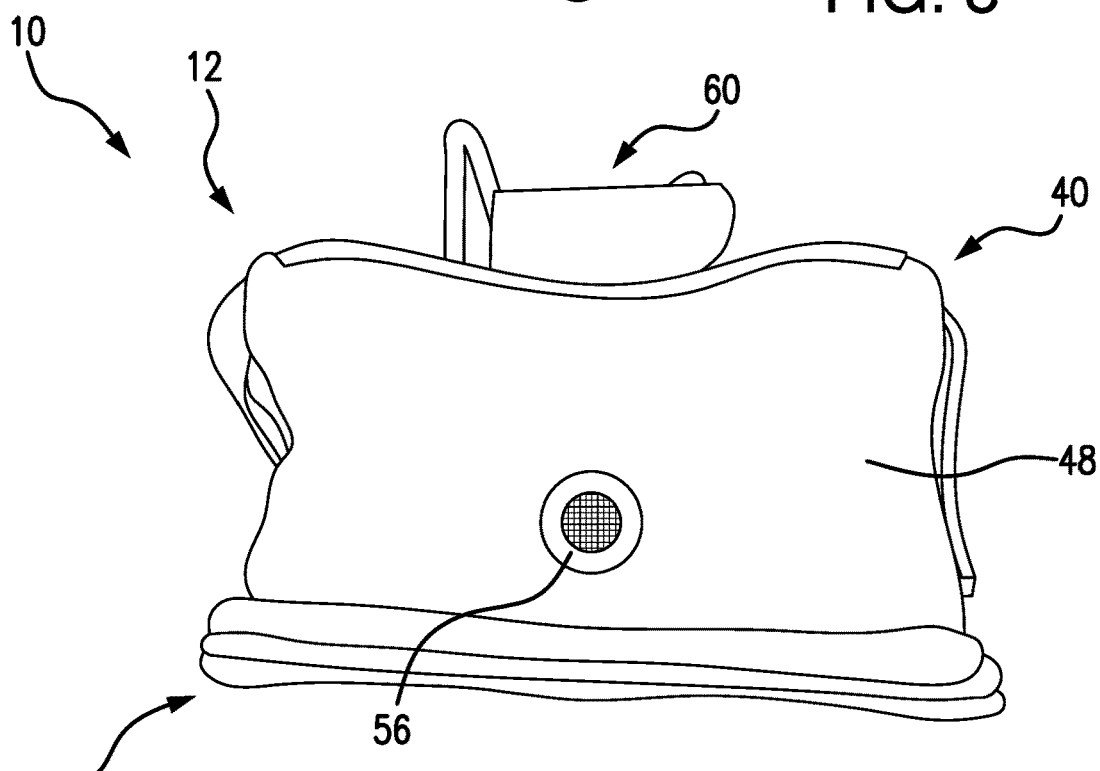
FIG. 9 is a bottom view of the holster of FIG. 1, according to an exemplary embodiment.
Figure 10:
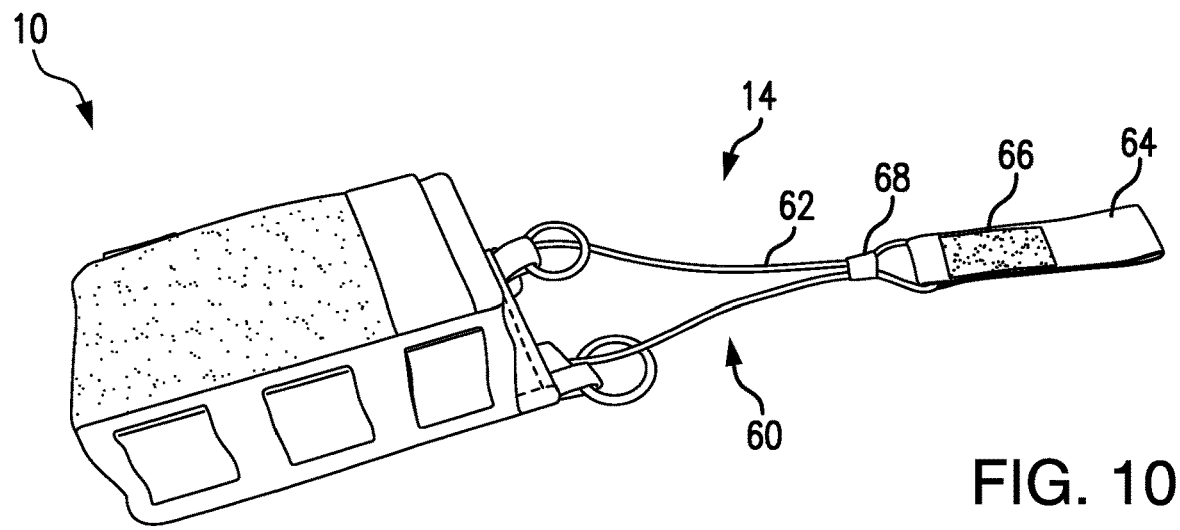
FIG. 10 is a perspective view of the holster of FIG. 1 in an opened configuration, according to an exemplary embodiment.

As shown in FIGS. 1-4 and 6-9, the pouch 40 has a first portion, shown as front wall 42; a second portion, shown as left sidewall 44; a third portion, shown as right sidewall 46; and a fourth portion, shown as bottom wall 48. According to an exemplary embodiment, the front wall 42, the left sidewall 44, the right sidewall 46, and the bottom wall 48 are a single, integral piece. In other embodiments, one or more of the front wall 42, the left sidewall 44, the right sidewall 46, and the bottom wall 48 are coupled (e.g., sewn, stitched, attached, etc.) together to form the pouch 40. As shown in FIGS. 1-3 and 6, the left sidewall 44 is coupled (e.g., sewn, stitched, fixed, attached, etc.) to the backing 20 along a left, longitudinal edge thereof. As shown in FIGS. 2, 3, and 7, the right sidewall 46 is coupled (e.g., sewn, stitched, fixed, attached, etc.) to the backing 20 along a right, longitudinal edge thereof. As shown in FIG. 9, the bottom wall 48 is coupled (e.g., sewn, stitched, fixed, attached, etc.) to the backing 20 along a bottom lateral edge thereof.

As shown in FIGS. 1-3 and 8, the backing 20 and the pouch 40 (e.g., the front wall 42, the left sidewall 44, the right sidewall 46, the bottom wall 48, etc.) cooperatively define an interior cavity, shown as device cavity 50. The device cavity 50 may be configured to receive a user device (e.g., a communication device, a hand tool, a weapon, etc.). As shown in FIGS. 2 and 3, the interior surface of the pouch 40 includes a liner material, shown as interior liner 52.

According to an exemplary embodiment, the interior liner 52 of the pouch 40 is manufactured from a fire resistant material and/or a fire retardant material. In one embodiment, the interior liner 52 of the pouch 40 is manufactured from the same material as the interior liner 24 of the backing 20. In other embodiments, the interior liner 52 of the pouch 40 is manufactured from a different material than the interior liner 24 of the backing 20. In one embodiment, the front wall 42, the left sidewall 44, the right sidewall 46, and/or the bottom wall 48 of the pouch 40 are manufactured from the same material as the exterior liner 26 of the backing 20. In other embodiments, the front wall 42, the left sidewall 44, the right sidewall 46, and/or the bottom wall 48 of the pouch 40 are manufactured from a different material than the exterior liner 26 of the backing 20.

As shown in FIGS. 1-4, the front wall 42 of the pouch 40 has a first securing element, shown as pouch securing element 54, disposed along and coupled (e.g., sewn, stitched, attached, fixed, with adhesive, etc.) thereto. According to the exemplary embodiment shown in FIGS. 1-4, the pouch securing element 54 is a component of a hook and loop fastener (e.g., a Velcro® strip, etc.). In other embodiments, the pouch securing element 54 is another type of securing element (e.g., a button for a snap fit connection, a clip, a clasp, a buckle, a male connector, a female connector, etc.).

As shown in FIG. 9, the bottom wall 48 defines an aperture, shown as bottom aperture 56. According to an exemplary embodiment, the bottom aperture 56 is configured to facilitate liquid drainage from the device cavity 50 (e.g., if a user of the holster 10 is wading through water, if raining gets inside the device cavity 50, etc.). As shown in FIGS. 1, 2, 4, 6, and 7, the pouch 40 includes a plurality of tabs, shown as tabs 58, spaced along the left sidewall 44 and the right sidewall 46. According to an exemplary embodiment, each of the tabs 58 includes a first end and an opposing second end that are attached to one of the left sidewall 44 and the right sidewall 46 such that each of the tabs 58 form a loop thereon. In some embodiments, one or more of the tabs 58 are non-elastic. In some embodiments, one or more of the tabs 58 are elastic (e.g., stretchable, etc.). The tabs 58 may receive and secure additional items, devices, tools, etc. to the exterior of the pouch 40 and/or facilitate securing the holster 10 to something (e.g., a belt, a strap, etc.). In other embodiments, at least one of the left sidewall 44 and the right sidewall 46 does not include the tabs 58.

As shown in FIGS. 1-7 and 10-12, the strap assembly 60 includes a cord (e.g., cable, string, para-cord, etc.), shown as strap cord 62; a handle, shown as strap handle 64, coupled to the strap cord 62 and having a second securing element, shown as strap securing element 66, coupled (e.g., sewn, stitched, attached, fixed, with adhesive, etc.) to a rear surface thereof; and an adjuster, shown as strap adjuster 68. As shown in FIGS. 1-5, the second loops 32 are configured to receive and couple (e.g., secure, attach, etc.) the strap cord 62 to the backing 20 in a loop shape with the strap handle 64 coupled to a portion of the loop defined by the strap cord 62 opposite of the backing 20 and the second loops 32. In some embodiments, the strap cord 62 is manufactured from an elastic material (e.g., the strap cord 62 is stretchable, etc.). According to an exemplary embodiment, the strap securing element 66 is configured to interface with the pouch securing element 54 to facilitate selectively coupling the strap handle 64 to the front wall 42 of the pouch 40. According to the exemplary embodiment shown in FIGS. 10-12, the strap securing element 66 is a component of a hook and loop fastener (e.g., a Velcro® strip, etc.) that corresponds with the pouch securing element 54. In other embodiments, the strap securing element 66 is another type of securing element (e.g., a button for a snap fit connection, a clip, a clasp, a buckle, a male connector, a female connector, etc.).

As shown in FIGS. 1-8 and 10-12, the strap assembly 60 is selectively reconfigurable between a first configuration, shown as closed configuration 12 (i.e., when the strap securing element 66 is in engagement with the pouch securing element 54), and a second configuration, shown as open configuration 14 (i.e., when the strap securing element 66 is disengaged from the pouch securing element 54). According to an exemplary embodiment, the strap assembly 60 is configured to (i) facilitate securing a device within the device cavity 50 when the strap assembly 60 is arranged in the closed configuration 12 and (ii) facilitate inserting the device into or removing the device from the device cavity 50 when the strap assembly 60 is arranged in the open configuration 14.

Figure 11:
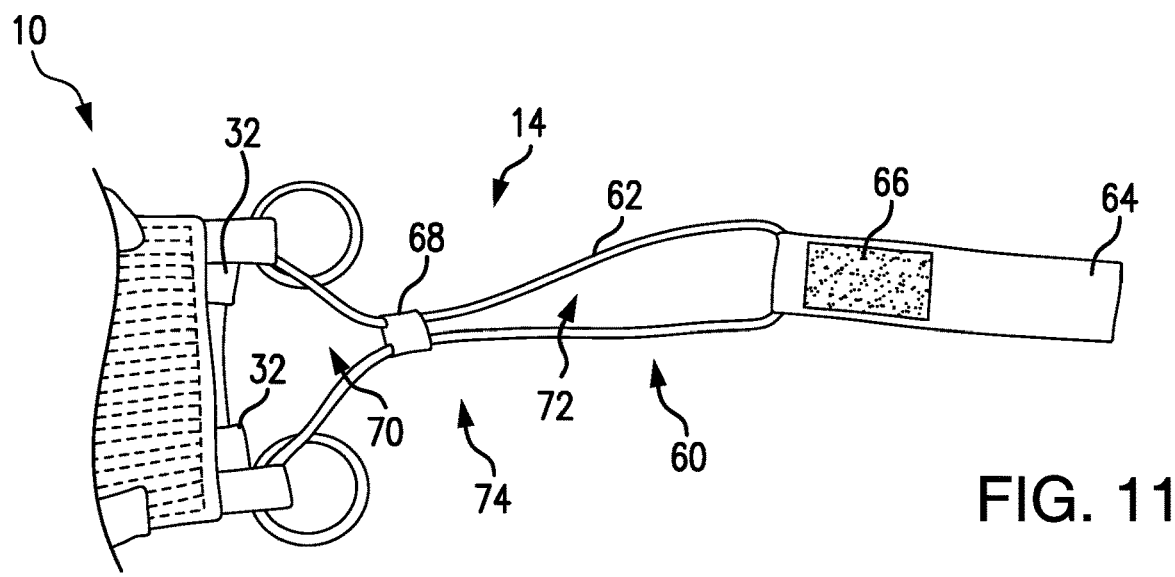
FIG. 11 is a detailed view of a strap of the holster of FIG. 10 in a tightened configuration, according to an exemplary embodiment.
Figure 12:
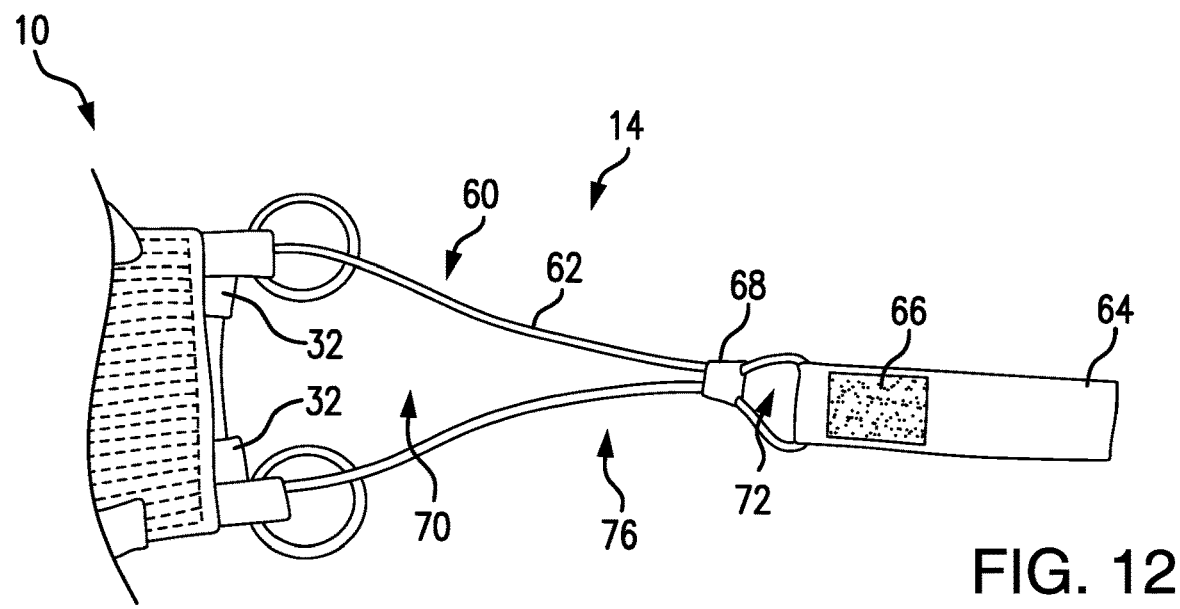
FIG. 12 is a detailed view of the strap of the holster of FIG. 10 in a loosened configuration, according to an exemplary embodiment.
Figure 13:
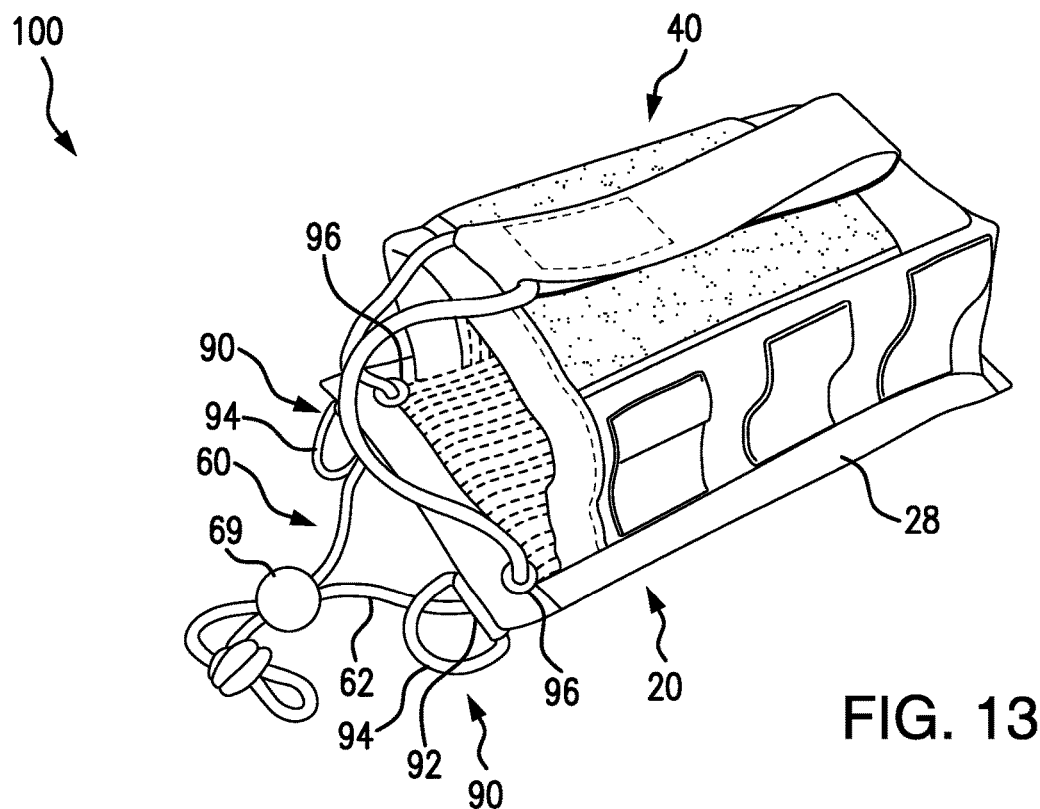
FIG. 13 is a first perspective view of a holster, according to another exemplary embodiment.
Figure 14:
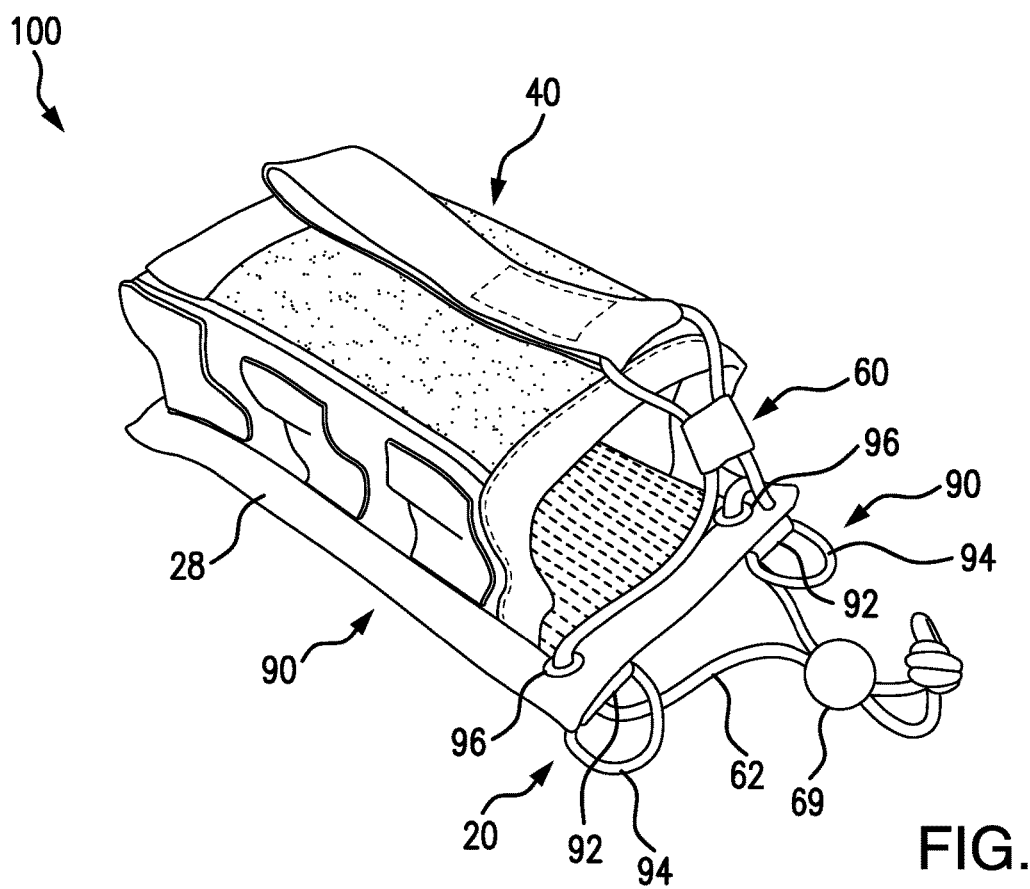
FIG. 14 is a second perspective view of the holster of FIG. 13, according to an exemplary embodiment.
Figure 15:
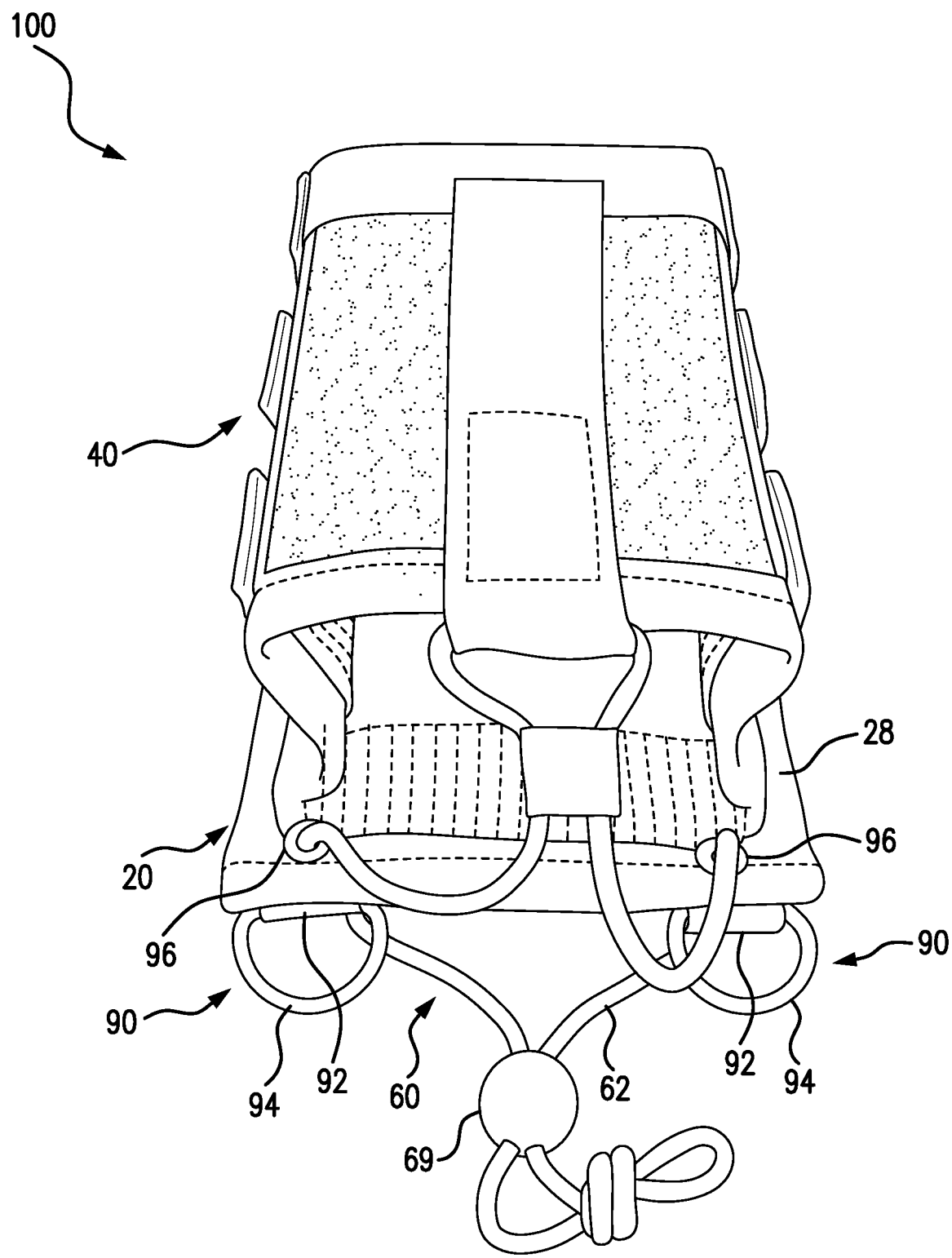
FIG. 15 is a top perspective view of the holster of FIG. 13, according to an exemplary embodiment.
Figure 17:
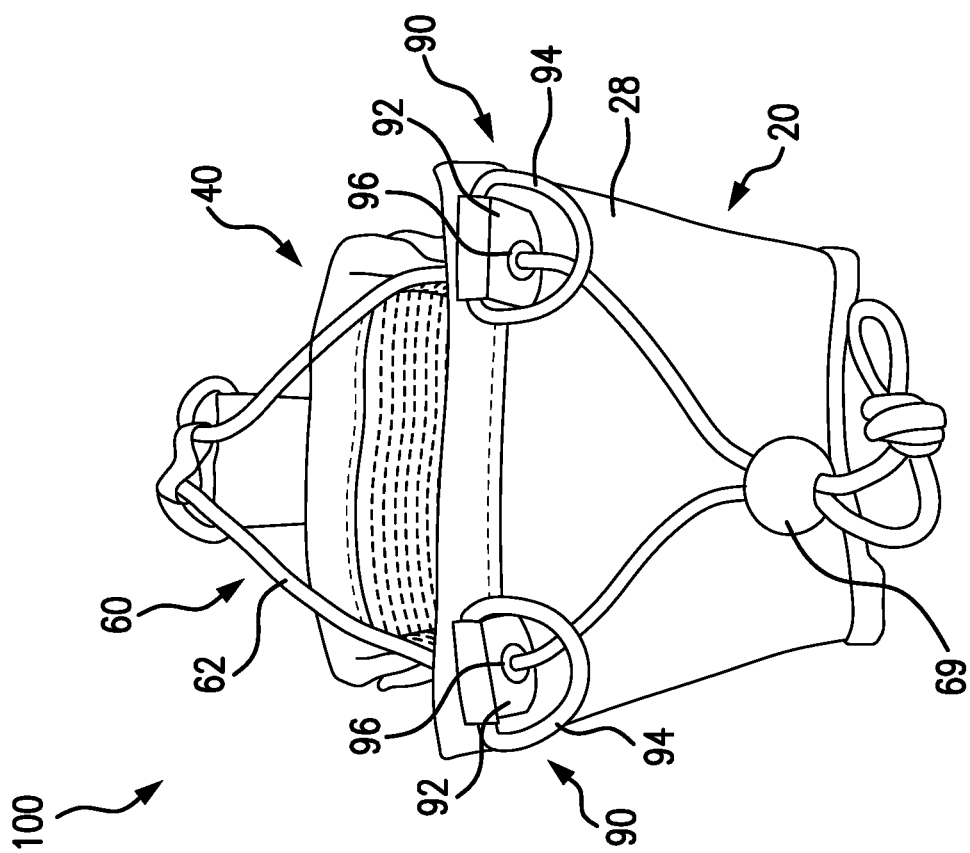
FIG. 17 is a rear view of the holster of FIG. 13, according to an exemplary embodiment.
Figure 16:
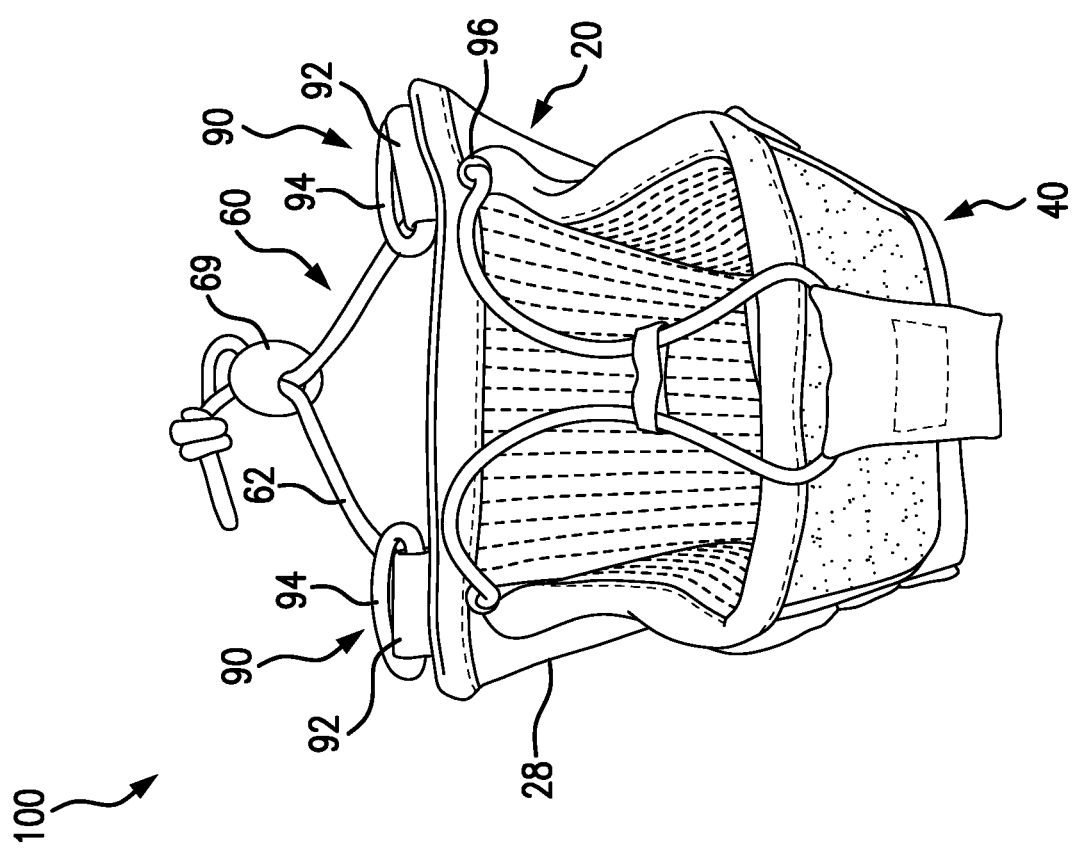
FIG. 16 is a top view of the holster of FIG. 13, according to an exemplary embodiment.

As shown in FIGS. 11 and 12, the strap adjuster 68 divides the loop of the strap cord 62 into a first section, shown as first loop 70, and a second section, shown as second loop 72. The strap adjuster 68 is selectively moveable along the strap cord 62 to reconfigure the strap assembly 60 between a first configuration, shown as tightened configuration 74, and a second configuration, shown as loosened configuration 76. As shown in FIG. 11, the first loop 70 is smaller than the second loop 72 when the strap adjuster 68 is positioned to arrange the strap assembly 60 in the tightened configuration 74. As shown in FIG. 12, the first loop 70 is larger than the second loop 72 when the strap adjuster 68 is positioned to arrange the strap assembly 60 in the loosened configuration 76. According to an exemplary embodiment, the strap cord 62 is configured to firmly secure (e.g., hug, fit snuggly against, grip, etc.) a device positioned within the device cavity 50 when (i) the strap securing element 66 of the strap handle 64 is coupled to the pouch securing element 54 of the front wall 42 in the closed configuration 12 and (ii) the strap adjuster 68 is positioned along the strap cord 62 such that the strap assembly 60 is arranged in the tightened configuration 74 (e.g., such that the first loop 70 grips a portion of the device, etc.).

According to the exemplary embodiment shown in FIGS. 13-17, a second device holder, shown as holster 100, is configured to receive and secure a device therein. By way of example, the holster 100 may be configured to receive and secure a communications device therein. The communications device may include a radio device, a walkie-talkie, a cell phone, a smart phone, and/or any other portable user communications device. By way of another example, the holster 100 may be configured to receive and secure any device (e.g., a hand tool, a weapon, a knife, a gun, a water bottle, etc.) that fits therein.

As shown in FIGS. 13-17, the holster 100 includes the backing 20, the pouch 40 coupled to the backing 20, and the strap assembly 60 coupled to the backing 20 and selectively couplable with the pouch 40. According to an exemplary embodiment, the backing 20 of the holster 100 includes the plate 22, the interior liner 24, and/or the exterior liner 26. As shown in FIGS. 13-17, the backing 20 further includes a cover, shown as spine 28, that extends around the periphery of the backing 20 and/or the pouch 40. The spine 28 may be a fabric manufactured from the same or similar material as the exterior liner 26. In other embodiments, the spine 28 is a rigid material (e.g., metal, plastic, carbon fiber, etc.) that provides further rigidity to the holster 100. According to an exemplary embodiment, the spine 28 is configured to conceal the peripheral edges of the layers (e.g., the plate 22, the interior liner 24, the exterior liner 26, a seam between the pouch 40 and the backing 20, etc.) of the backing 20 and/or the pouch 40.

According to an exemplary embodiment, the pouch 40 of the holster 100 includes the front wall 42, the left sidewall 44, the right sidewall 46, the bottom wall 48, the interior liner 52, the pouch securing element 54, the bottom aperture 56, and/or the tabs 58. According to an exemplary embodiment, the strap assembly 60 of the holster 100 includes the strap cord 62, the strap handle 64, and/or the strap securing element 66. As shown in FIGS. 13-17, the strap assembly 60 further includes a second strap adjuster, shown as strap tightener 69, coupled to the strap cord 62 at an end thereof opposite the strap handle 64 (i.e., on opposite sides of the backing 20). According to an exemplary embodiment, the strap tightener 69 is selectively repositionable along the strap cord 62 to adjust, i.e., loosen or tighten, the strap assembly 60 and thereby facilitate selectively contracting or retracting, respectively, the device cavity 50 defined between the backing 20 and the pouch 40.

As shown in FIGS. 13-17, the holster 100 does not include the first loops 30, the second loops 32, or the coupling rings 80 that are included with the holster 10. Rather, the holster 100 includes couplers or securing elements, shown as ring assemblies 90, coupled (e.g., fixed, secured, fastened, riveted, etc.) at opposing lateral sides of an upper lateral edge of the backing 20. As shown in FIGS. 13-17, each of the ring assemblies 90 includes a plate element, shown as coupling plate 92, coupled to the backing 20 (e.g., to the exterior liner 26, to the interior liner 24, etc.); a ring, shown as D-ring 94, pivotally coupled to the coupling plate 92; and an aperture, shown as eyelet 96, that extends through the coupling plate 92 and the backing 20.

According to an exemplary embodiment, the D-rings 94 of the ring assemblies 90 facilitate coupling the holster 100 to a strap, belt, or other device that can be worn by a user of the holster 100. In other embodiments, the ring assemblies 90 are replaced with the first loops 30, the second loops 32, and the coupling rings 80. In still other embodiments, the ring assemblies 90 are replaced with clips, clasps, ties, and/or still other types of suitable coupling elements. As shown in FIGS. 13-17, the strap cord 62 of the strap assembly 60 extends through the backing 20 and the coupling plates 92 via the eyelets 96.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A holster for a communications device, comprising:
a backing having a first longitudinal edge, an opposing second longitudinal edge, a first lateral edge, and an opposing second lateral edge, wherein the backing comprises a rigid layer, an interior layer, and an exterior layer, wherein the rigid layer is sandwiched between the interior layer and the exterior layer, the interior layer comprising a backing interior liner, the backing interior liner including at least one of a fire resistant material and a fire retardant material;
a pouch, wherein an interior surface of the pouch comprises at least one of a fire resistant material and a fire retardant material, the pouch configured to be selectively contracted, having a front wall, a first sidewall, an opposing second sidewall, and a bottom wall, the pouch including a first securing element disposed along the front wall, wherein the first securing element comprises a component of a hook and loop fastener, the pouch further comprising a plurality of tabs spaced along at least one of the first sidewall and the opposing second sidewall, wherein the first sidewall is coupled along the first longitudinal edge of the backing, the opposing second sidewall is coupled along the opposing second longitudinal edge of the backing, and the bottom wall is coupled along the opposing second lateral edge of the backing, and wherein the backing and the pouch cooperatively define a cavity configured to selectively receive the communications device;

a first coupler secured to the backing along the first lateral edge proximate the first longitudinal edge, the first coupler defining a first eyelet;

a second coupler secured to the backing along the first lateral edge proximate the opposing second longitudinal edge, the second coupler defining a second eyelet, and a second ring attached to the second coupler; and a strap assembly coupled to the backing and selectively couplable with the pouch, and configured to selectively contract the pouch thereby selectively contracting the cavity, the strap assembly including:
- a cord extending through the first eyelet and the second eyelet;
- a handle coupled to the cord along a portion of the cord; and
- a second securing element disposed along a surface of the handle, wherein the second securing element comprises an opposite component of the component of the hook and loop fastener of the first securing element, the second securing element selectively couplable to the first securing element of the pouch.

* * * * *